Nov. 30, 1965  J. E. THUROW  3,220,307
VARIABLE FOCAL LENGTH LENS SYSTEM HAVING LINEAR
DIFFERENTIAL MOTION BETWEEN LENS UNIT
Filed Dec. 5, 1960  3 Sheets-Sheet 3

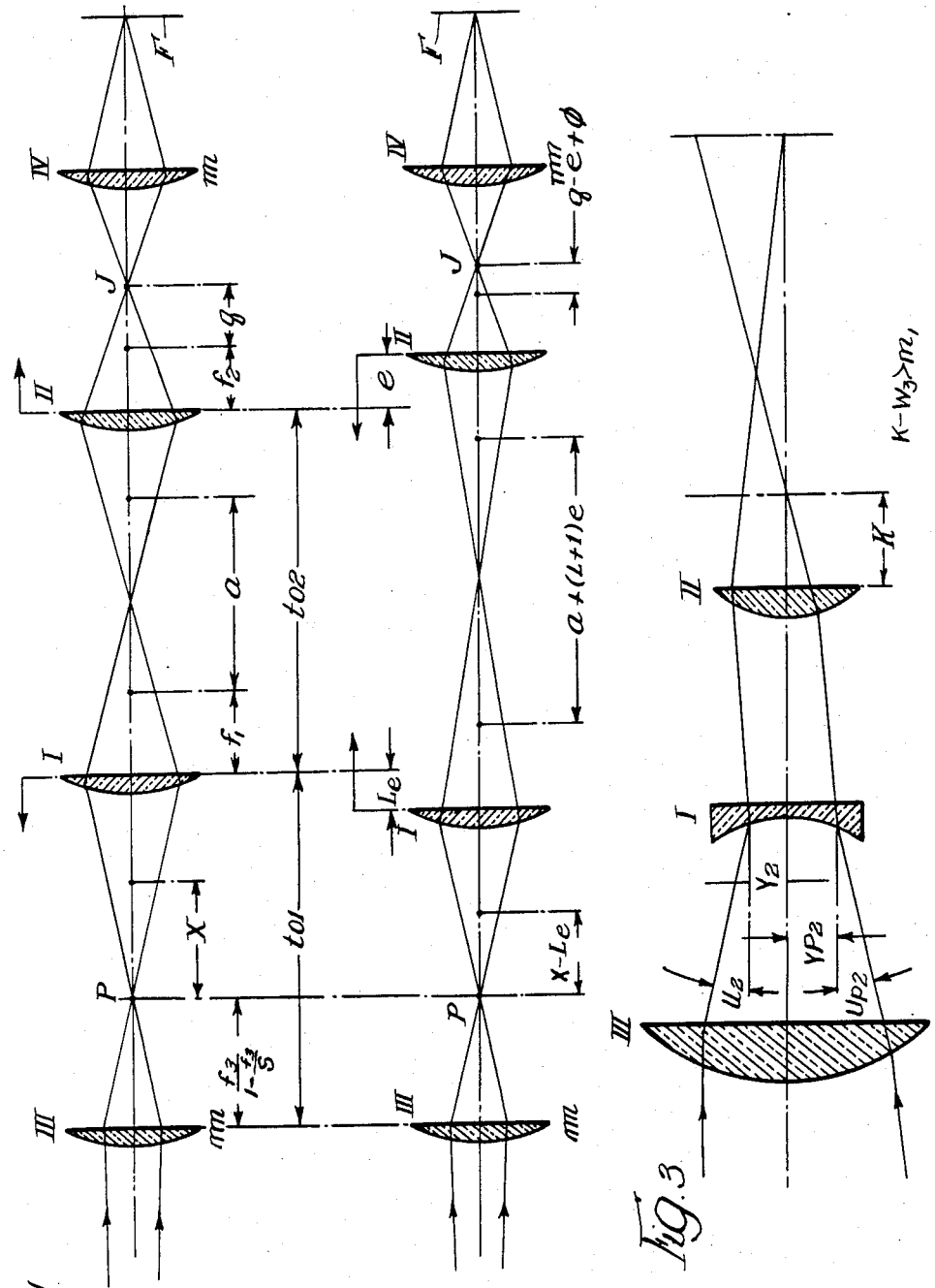

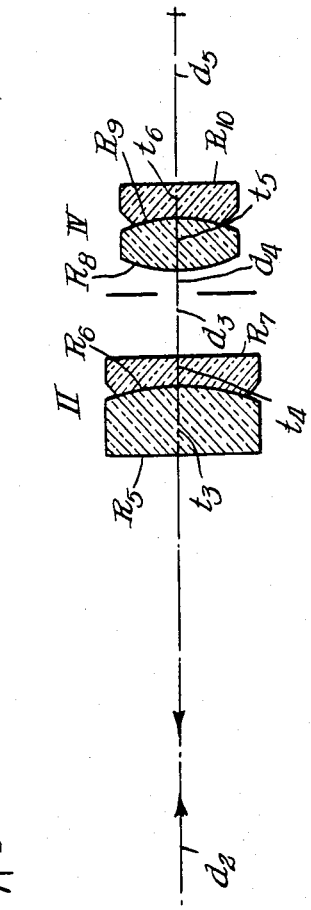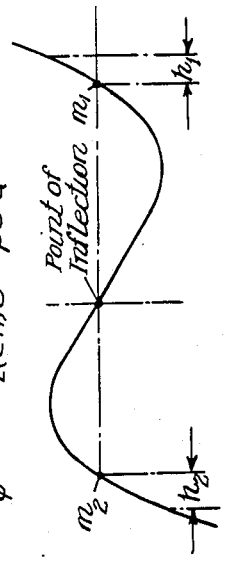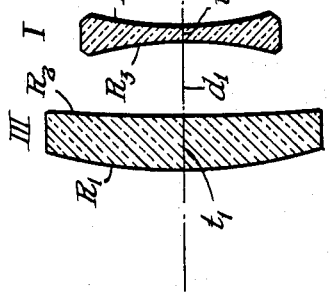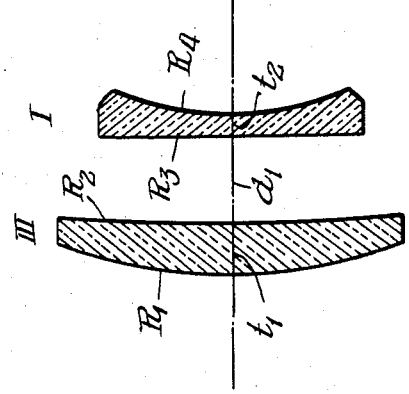

INVENTOR.
James E. Thurow,
BY
Byron, Hume, Groen + Clement.

United States Patent Office 3,220,307
Patented Nov. 30, 1965

3,220,307
VARIABLE FOCAL LENGTH LENS SYSTEM HAVING LINEAR DIFFERENTIAL MOTION BETWEEN LENS UNIT
James E. Thurow, 2805 Canterbury, Ann Arbor, Mich.
Filed Dec. 5, 1960, Ser. No. 73,788
16 Claims. (Cl. 88—57)

This invention pertains to optically compensated variable focal length systems and more specifically to an improved variable focal length system in which the power of the system is varied by means of linear differential motion between lens units and the position of focus remains substantially constant throughout the variable power range and the aberrations, and the change and the rate of change of same are within aceptable limits.

Variable focal length or zoom systems are well known and the prior art regarding the same is quite prevalent. Particularly, in the past few years with the advent of television there has been considerable research devoted to the development of variable focal length systems.

During the past year or so, the desire and need has arisen for zoom systems which are particularly suited for use in conjunction with photographic equipment of the type normally purchased and used by amateur photographers. The requisites imposed on such systems are minimum of cost, simplicity, compactness, ease of operation, as well as excellence of optical performance. As a result of these requisites, the prior art systems are somewhat less than suitable.

One optically compensated system which has been commonly used in conjunction with professional equipment, such as television cameras, and commercial movie cameras, and the like, embodies two coupled lens units which are moved with respect to an intermediate third unit to obtain the zoom effect. While such a system does fulfill many of the requirements imposed upon it, it does have limitations which are a severe handicap in certain fields. For example, the nature of such a system is restrictive regarding the design parameters which permit minimization of size. Consequently, many of the known systems embodying such an arrangement of lens units are relatively complex, bulky and costly. Another limiting characteristic of such systems when the first element moves is that the range of maximum to minimum object distances that can be accommodated without adversely affecting the optical compensation of focus deviation is restricted.

Another type of variable focal length systems prevalent in the prior art utilizes two lens units which are moved with respect to each other in which the relative motion is non-linear. While the non-linear system obviates some of the problems of the previously mentioned coupled unit system, it presents certain other problems that limit its use. For example the mechanical apparatus necessary for effecting the non-linear motion is relatively complex and expensive and as a result is unsuitable for projectors and cameras commonly used by amateur photographers.

I have invented an optically compensated system embodying lens units relatively movable at a linear rate which substantially eliminates the undesirable features of the previously discussed systems and is particularly suitable for the type of projectors and cameras used by amateurs. Such a system affords an infinite choice of relative linear rate which in turn permits an infinite choice of parameters for the design of the system. By constructing the system in accordance with the subject invention it is possible to obtain a substantially constant back focal length throughout the zoom range in which there is minimum deviation between points of full compensation for a particular number of moving lens units and the zoom range selected.

A foremost feature and object of the invention resides in the provision of a variable focal length system which utilizes a plurality of lens units which are relatively movable at some predetermined linear rate to effect a variance in focal length.

A further feature and object of the invention resides in the provision of a variable focal length system in which the deviation of the back focal length throughout the zoom range is within acceptable limits.

A still further feature and object of the invention resides in the provision of a variable focal length system which requires a relatively small number of elements and is relatively simple in construction.

A still further feature and object of the invention resides in the provision of a variable focal length system which permits a substantial reduction in size and number of elements for a given standard of optical compensation.

A still further feature and object of the invention resides in the provision of a variable focal length system which has a minimum of three points of optical compensation.

A still further feature and object of the invention resides in the provision of a variable focal length system in which the residual aberrations in the zoom portion of the system are substantially constant.

A still further feature and object of the invention resides in the provision of a variable focal length system which is especially suited for use in conjunction with cameras and projectors normally used by amateurs.

These and other features and objects of the invention will be apparent upon reading of the specification.

In the drawings:

FIGURES 1, 2, and 3 are schematic representations of a lens system for illustrating the parameters used in designing a variable focal length system embodying the invention.

FIGURE 4 is a graphical representation of the deviation of focus of the zoom portion with respect to the displacement of one of the movable lens groups relative to a reference point.

FIGURE 5 is a sectional view of a lens system embodying the invention.

FIGURE 6 is a sectional view of a modified form of the lens system embodying the invention.

Figure 7:
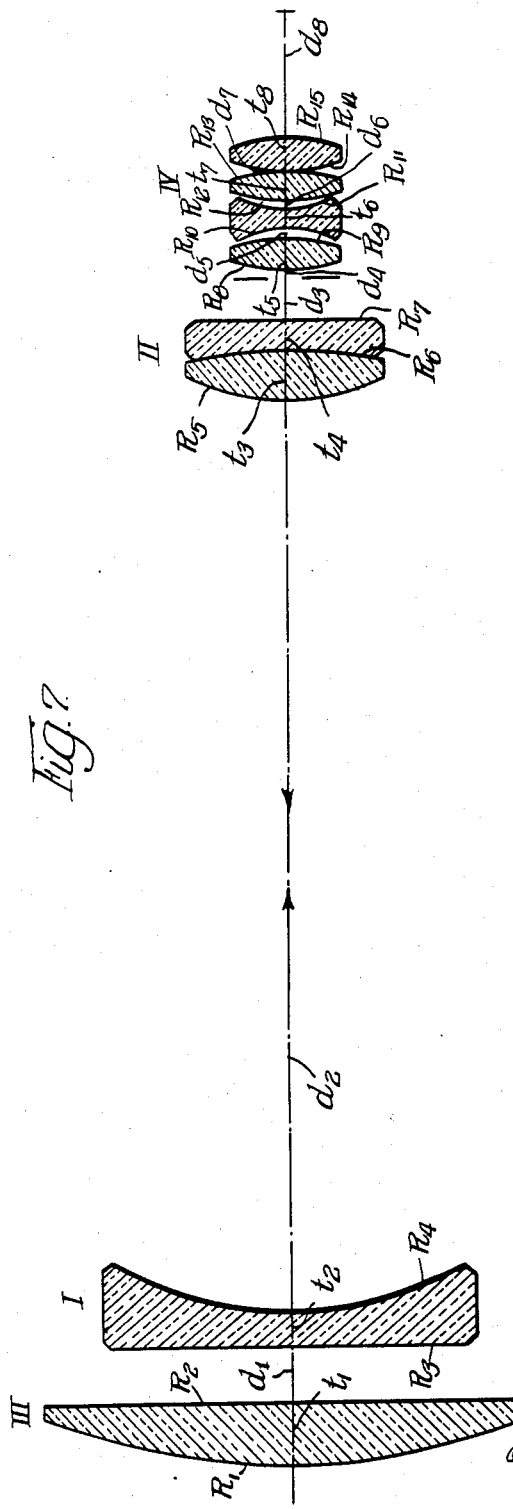
FIGURE 7 is a sectional view of another modified form of the lens system embodying the invention.

It is to be understood that while a preferred form of the invention contemplates three or four lens units, the system is not to be limited to such. In fact in some instances the system may include only two lens units which are linearly movable with respect to each other as will be described in detail hereinafter.

Referring now to FIGURES 1 and 2 there is shown a schematic illustration of the system which includes four units. The two relatively movable lens units are denoted I and II, respectively, with the incident light coming from the left hand passing through unit I first. It is to be noted that the lens units are not numbered in the order in which they appear in the system for purposes of convenience as will be seen later on. A stationary lens unit III is positioned to the left of lens unit I intermediate the latter and the object (not shown). A second stationary lens unit IV is positioned to the right of lens unit II intermediate the latter and the image or film plane F. Lens units I, II, and III form the variable focal length, or zoom portion, of the system with the lens unit IV forming the relay portion of the system.

It is to be understood that the terminology "lens unit" refers to one or more lens elements. The lens system embodying the invention may comprise either a complete zoom lens or an afocal attachment which utilizes linear differential motion between lens units for varying the focal length. The lens unit III forms image point "P" and is considered stationary, but may be moved to accommodate any object distance maintaining P fixed. Lens units I and II move relative to each other at some predetermined linear rate "L" and comprise the focal length variance means. Lens unit II is displaced from a reference with the displacement being designated "e." The lens unit IV is stationary and corrects the aberrational residuals as well as to magnify the image formed by lens units I, II and III.

In some instances the lens unit IV may be omitted. For example, if the lens units I, II and III are designed so that the residual aberrations are within acceptable limits and the image formed thereby requires neither magnification nor demagnification, then lens unit IV may be omitted. Moreover, lens unit III may be omitted in certain instances so that the ultimate system comprises only movable lens units I and II, as was mentioned previously. In that case the object would fall at point P rather than the image normally formed by lens unit III. Such a system would require a fixed object or image at a predetermined point P as would be found in an enlarger.

The parameters shown in FIGURES 1, 2 and 3 and those used in defining the system are as follows:

$\phi$ is the deviation of focus of the lens system as the lens groups are moved;

L is the linear rate of motion of lens unit I relative to lens unit II;

e is the displacement of the lens unit II from a reference point;

$f_1$, $f_2$, $f_3$, and $f_4$ are the effective focal lengths of lens units I, II, III and IV, respectively;

a is the distance between the secondary focal point of lens unit I and the primary focal point of lens unit II;

S is the distance from the primary principal plane of the lens unit III to an object or image;

$m_1$ and $m_2$ are the values of e when $\phi$ equals zero;

K is the distance from the secondary principal plane of lens unit II to the aperture stop at a mean position when e is zero;

$h_1$ is the amount of lens unit travel exceeding $m_1$ permissible in which the corresponding $\phi$ is equal to or less than some acceptable value;

J is the image point formed by lens units I, II and III and shifts in space as per $\phi$;

x is the distance from the image point P to the primary focal point of the first lens unit when e is zero;

$h_2$ is the amount of lens unit travel exceeding $m_2$ permissible in which the corresponding $\phi$ is equal to or less than some acceptable value;

$W_1$ is a factor to take into account the thicknesses of lens units I and II and $h_2$ to prevent interference therebetween;

$W_2$ is a factor to take into account the thicknesses of lens units I and III and $h_1$ to prevent interference therebetween;

$W_3$ is a factor to take into account the thickness of lens unit II and $h_1$;

Z is the zoom ratio;

$t_{01}$ is the distance from the secondary principal plane of lens unit III to the primary principal plane of lens unit I when e is zero;

$t_{02}$ is the distance from the secondary principal plane of lens unit I to the primary principal plane of lens unit II when e is zero;

$t_{03}$ is the distance from the secondary principal plane of lens unit II to the primary principal plane of lens unit IV when e is zero;

$u_i$ is the respective slopes of a paraxial ray before lens units I, II and III;

$y_i$ is the respective principal intercept heights of a paraxial ray at lens units I, II and III;

$u_{pi}$ is the respective slopes of a principal ray (a ray that pierces the aperture stop center) before lens units I, II and III;

$y_{pi}$ is the respective principal plane intercept heights of a principal ray at lens unit I, II and III.

I have discovered that a particular set of formulae for determining the parameters of an optically compensated linear differential motion zoom lens system which includes two movable elements are:

(1) $$f_1{}^2 = \frac{(L+1)(x)(Ax+L)}{AL}$$

(2) $$a = \frac{(L+1)(x)(Ax+2L)}{L(Ax+L)}$$

(3) $$f_2{}^2 = \frac{-L(L+1)(x)(1-B)}{A(Ax+L)^2}$$

Where:

$$A = \frac{Z-1}{\sqrt{Z}} \quad m_1 = \frac{\sqrt{Z}}{\sqrt{Z}+1}$$

$$B = \frac{-(Ax+L)}{x} \frac{\sqrt{Z}-1}{\sqrt{Z}+1} \quad m_2 = \frac{-1}{\sqrt{Z}+1}$$

$$f_1 < 0 \quad f_2 > 0 \quad m_1 - m_2 = 1$$

$$L > 0 \quad Z > 0 \quad \sqrt{Z} > 0$$

x is chosen so that:

(4) $$a + f_1 + f_2 - W_1 \geq \frac{L+1}{\sqrt{Z}+1}$$

In the event that the system should include a lens unit III which is to the left of lens unit I and which provides a fixed image point P, the inequality for determining the focal length of lens unit III is as follows:

$f_3$ is chosen so that:

(5) $$x + \frac{f_3 + f_1}{1 - \frac{f_3}{S}} - W_2 \geq \frac{L\sqrt{Z}}{\sqrt{Z}+1}$$

In the above formulae $f_1$, $f_2$, $f_3$, a and x are chosen so as to satisfy the equations and inequalities 1 through 5. After the parameters in Formulae 1 through 5 have been determined it is necessary to select the proper glass and radii for lens units I, II and III in order to minimize the aberrational change throughout the zoom range for reasons more fully explained hereinafter.

The selection of the proper glass and radii was accomplished by setting the sums of the partial differentials of the third order aberration coefficients equal to some accepted maximum. It is to be noted that the differential of the third order aberration coefficients gives a rate of change of the aberration within the zoom range. By maintaining a rate of change to a relatively low value, it is generally possible to maintain the overall change to within accepted limits. It is to be understood, however, that in a few cases, notwithstanding the maintenance of the rate of change to a small magnitude, the overall change will be greater than can be tolerated, so that the change of the aberration coefficients must be set to some acceptable maximum value.

For a thin lens in air, the third order aberration coefficients are as follows:

$$\text{Axial Color } a = \frac{y^2 \theta}{V}$$

$$\text{Lateral Color } b = \frac{y y_D \theta}{V}$$

Where:

V is the Abbe number of the glass and $\theta$ is $1/f$ Spherical Aberration $G =$ $$y^4 \left[ \frac{-\theta^3 n^2}{(n-1)^2} + \frac{\theta^2 c(2n+1)}{(n-1)} - \frac{\theta c^2(n+2)}{n} \right] +$$

$$y^3 u \left[ \frac{-\theta^2(3n+1)}{(n-1)} + \frac{4\theta c(n+1)}{n} \right] - y^2 u^2 \left[ \frac{\theta(3n+2)}{n} \right]$$

Where:

$n$ is the index of refraction of the chosen glass and $c$ is the curvature of the surface towards the incident light or $1/r$ $$\text{Coma } F = \frac{G(y_D)}{y} - y^2 I \left[ \frac{-\theta^2 n}{(n-1)} + \frac{\theta c(n+1)}{n} \right] +$$

$$y u I \left[ \frac{\theta(2n+1)}{n} \right]$$

Where: $I = y_p u - y u_p$ $$\text{Astigmatism } \phi = G \left( \frac{y_D}{y} \right)^2 - y_D y I \left[ \frac{-\theta^2 2 n}{(n-1)} + \frac{\theta c 2(n+1)}{n} \right] +$$

$$y_D u I \left[ \frac{2\theta(2n+1)}{n} \right] - I^2 \theta$$

$$\text{Distortion } D = G \left( \frac{y_D}{y} \right)^3 - (y_D)^2 I \left[ \frac{-\theta^2(2n+1)}{(n-1)} + \right.$$

$$\left. \frac{3\theta c(n+1)}{n} \right] + y_D u_D I \left[ \frac{\theta(n+1)}{n} \right] + \frac{y_D^2 u I}{y} \left[ \frac{\theta(3n+2)}{n} \right]$$

As can be seen from FIGURE 3 and the definitions of the parameters, all $y$'s and $u$'s refer to principal plane and ray intercepts which may be calculated by tracing a paraxial rim ray and a maximum principal ray through the zoom system. It can be shown that all $y$'s, $u$'s, $y_p$'s and $u_p$'s are functions of the displacement variable $e$.

In order for the quality of the system to remain as consistent as possible, the aberrations shown remain substantially constant throughout the zoom range. Furthermore, the consistency of aberrations is necessary if the relay unit is to correct the residual aberrations throughout the zoom range. Thus, the difference between the value of the aberrations at any point of $e$ within the range of $m_1$ and $h_1$ to $m_2$ and $h_2$ and the value at some reference point must be equal to or less than some accepted value. As was mentioned previously, the consistency of aberration may generally be obtained by setting the absolute values of the sum of the partial differentials of the respective aberrations for the lens units I, II and III equal to or less than some accepted value.

Thus:

(6) $$\left| d \left[ \frac{\sum_I^{III} a}{de} \right] \right| \leq |A_a|$$

(7) $$\left| d \left[ \frac{\sum_I^{III} b}{de} \right] \right| \leq |A_b|$$

(8) $$\left| d \left[ \frac{\sum_I^{III} G}{de} \right] \right| \leq |A_G|$$

(9) $$\left| d \left[ \frac{\sum_I^{III} F}{de} \right] \right| \leq |A_F|$$

(10) $$\left| d \left[ \frac{\sum_I^{III} \phi}{de} \right] \right| \leq |A_\phi|$$

(11) $$\left| d \left[ \frac{1/2 I \sum_I^{III} D + \frac{(u_D'^2 - (u_D)^2)}{2}}{de} \right] \right| \leq |A_D|$$

Where: $A_x$ is the acceptable value for the rate of change or change of a particular aberration throughout the zoom range.

The radii, glass, speed and maximum off axis coverage are chosen so that conditions (6) through (11) are fulfilled. Normally the third order equations are sufficient because of the low operating speed of the zoom portion; however, a higher order analysis may be used where desired.

It should be kept in mind that the fact that the rate of change or change of the third order aberrations is maintained within limits does not insure that the aberrations themselves will be within accepted limits. If the residual aberrations are without accepted limits, they may be corrected by the relay lens unit IV as mentioned previously.

After the parameters of Equations 1 through 5 have been resolved, the deviation of focus may be calculated to determine if it is within acceptable limits. The general expression for the deviation of focus caused by the linear differential motion of adjacent lens groups is as follows:

(12)
$$\phi = \frac{L(L+1)e^3 - e^2 \left[ (L+1)(x) - La + \frac{L(L+1)}{ax - f_1^2} f_2^2 x \right] - e \left[ ax - f_1^2 + f_2^2 \frac{(Lf_1^2 - (L+1)x^2)}{ax - f_1^2} \right]}{L(L+1)e^2 - e[(L+1)(x) - La] - (ax - f_2^2)}$$

It can be seen that the expression for $\phi$ is a rational fraction in which the numerator is of the third order and the denominator of the second order.

In FIGURE 4 there is shown a graphical representation of $\phi$ in which the point of inflection is arbitrarily chosen as the origin with the points of zero focus deviation or full compensation at $m_1$ and $m_2$.

Thus:

(13) $$\phi = \frac{L(L+1)e^3 - pBe^2 - QBe}{L(L+1)e^2 - pe - Q}$$

Where:

$$B = \frac{-(Ax + L)}{x} \frac{\sqrt{Z} - 1}{\sqrt{Z} + 1} = \frac{d\phi}{de} \bigg|_{e=0}$$

$$p = (L+1)(x) - La$$

$$Q = ax - f_1^2$$

By calculating the deviation of focus from a given set of values derived for the parameters in Formulae 1 through 5, it can be determined if it is within acceptable limits. If not, the system may then be scaled until the deviation of focus is within limits. It may be that after scaling, the system is unfeasible with regard to size, speed and the like for the particular use. If that is the case, then the parameters in Formulae 1 through 5 may be recalculated until such a system with an acceptable deviation of focus or size is found. It is to be understood that acceptable limits of deviation of focus and size will vary with each particular type of use so that what is acceptable for one use may be unacceptable for another and vice versa.

Referring now to FIGURES 5 through 8 there are shown four examples of differential motion lens system embodying the invention. In each of these systems the differential motion is unity ($L=1$); however, it is to be understood that the motion may be any other positive finite number and that unity is merely by way of example. It will be noted that all of the four examples are eight mm. lens systems designed for use in conjunction with movie cameras. It will be understood that such use is merely by way of example.

The mechanical construction (not shown) for supporting the lens units may be of a conventional construction. For example, the movable units may be motivated by means such as rack and pinion gearing, a closed loop of cord or wire, linear cams and the like, which are adapted to provide linear differential motion.

In the following tables there is set forth the constructional data of the lens systems shown in FIGURES 4 through 8. The lens units have been numerically designated so that unit III is facing the object with units I, II and IV following in that order in conformance with the rest of the specification. The radii, thicknesses, and spaces have been numbered according to the order in which they occur from left to right in the conventional manner. In the tables and claims in which they occur, the lens units will be listed in the order in which they occur, notwithstanding the fact that the aforementioned numerical designation does not follow such order. In the tables the symbols R, t, d are the radii, thickness and spaces, respectively, and the symbols L, $N_D$, V are the linear rate of differential motion, index of refraction in sodium D light and the reciprocal dispersion ratio (Abbe number), respectively.

The variable focal length system shown in FIGURE 5 is as follows:

Table I

[8 mm. zoom camera lens. 12 to 32 mm. E.F.L. at f/2. Infinite object $L=1$]

| Lens Unit | Radii | Thicknesses (t), Spaces (d) | $N_D$ | V |
|---|---|---|---|---|
| III | $R_1 = 35.650$ $R_2 = 92.945$ | $t_1=3.840$ | 1.620 | 60.3 |
| | | $d_1=5.620$ to 24.890 | | |
| I | $R_3 = -39.960$ $R_4 = 45.794$ | $t_2=1.840$ | 1.620 | 60.3 |
| | | $d_2=40.530$ to 1.990 | | |
| II | $R_5 = 38.768$ $R_6 = -14.489$ $R_7 = -81.067$ | $t_3=5.070$ | 1.617 | 54.9 |
| | | $t_4=1.840$ | 1.617 | 36.6 |
| | Stop | $d_3=4.270$ to 23.540 | | |
| | | $d_4=1.460$ | | |
| IV | $R_8 = 11.420$ $R_9 = -11.420$ $R_{10}=$Infinity | $t_5=3.840$ | 1.517 | 54.9 |
| | | $t_6=2.780$ | 1.720 | 29.3 |
| | | $d_5=12.000$ | | |

The variable focal length system shown in FIGURE 6 is as follows:

Table II

[8 mm. zoom camera lens. 9.48 to 25.35 mm. E.F.L. at f/1.9. 20 foot object $L=1$]

| Lens Unit | Radii | Thicknesses (t), Spaces (d) | $N_D$ | V |
|---|---|---|---|---|
| III | $R_1 = 44.71$ $R_2 = 197.840$ | $t_1=3.500$ | 1.620 | 60.3 |
| | | $d_1=6.513$ to 26.380 | | |
| I | $R_3 =$ infinite $R_4 = 21.825$ | $t_2=1.500$ | 1.620 | 60.3 |
| | | $d_2=43.867$ to 4.133 | | |
| II | $R_5 = 27.652$ $R_6 = -17.924$ $R_7 =$ infinite | $t_3=2.400$ | 1.617 | 54.9 |
| | | $t_4=1.00$ | 1.617 | 36.6 |
| | Stop | $d_3=2.414$ to 22.281 | | |
| | | $d_4=1.00$ | | |
| IV | $R_8 = 12.700$ $R_9 = -51.600$ $R_{10}=-12.700$ $R_{11}=14.820$ $R_{12}=$infinite $R_{13}=-16.00$ $R_{14}=28.700$ $R_{15}=-16.00$ | $t_5=2.200$ | 1.620 | 60.3 |
| | | $d_5=.444$ | | |
| | | $t_6=2.000$ | 1.649 | 33.8 |
| | | $d_6=.498$ | | |
| | | $t_7=2.000$ | 1.617 | 54.9 |
| | | $d_7=.127$ | | |
| | | $t_8=2.380$ | 1.620 | 60.3 |
| | | $d_8=10.7498$ | | |

The variable focal length system shown in FIGURE 7 is as follows:

Table III

[8 mm. zoom camera lens. 7.39 to 29.33 E.F.L. at f/2. Infinite object $L=1$]

| Lens Unit | Radii | Thicknesses (t), Spaces (d) | $N_D$ | V |
|---|---|---|---|---|
| III | $R_1=68.439$ $R_2=-1,246.490$ | $t_1=3.664$ | 1.620 | 60.3 |
| | | $d_1=4.355$ to 35.580 | | |
| I | $R_3=$infinite $R_4=23.294$ | $t_2=2.695$ | 1.620 | 60.3 |
| | | $d_2=66.356$ to 3.906 | | |
| II | $R_5=27.915$ $R_6=-27.375$ $R_7=$infinite | $t_3=3.288$ | 1.617 | 54.9 |
| | | $t_4=1.617$ | 1.689 | 30.9 |
| | Stop | $d_3=1.790$ to 33.015 | | |
| | | $d_4=.964$ | | |
| IV | $R_8=12.051$ $R_9=-48.962$ $R_{10}=-12.051$ $R_{11}=14.062$ $R_{12}=$infinite $R_{13}=-15.182$ $R_{14}=27.233$ $R_{15}=-15.182$ | $t_5=2.087$ | 1.617 | 54.9 |
| | | $d_5=.422$ | | |
| | | $t_6=1.897$ | 1.649 | 33.8 |
| | | $d_6=.472$ | | |
| | | $t_7=1.897$ | 1.617 | 54.9 |
| | | $d_7=.120$ | | |
| | | $t_8=2.258$ | 1.620 | 60.3 |
| | | $d_8=10.543$ | | |

Figure 8:
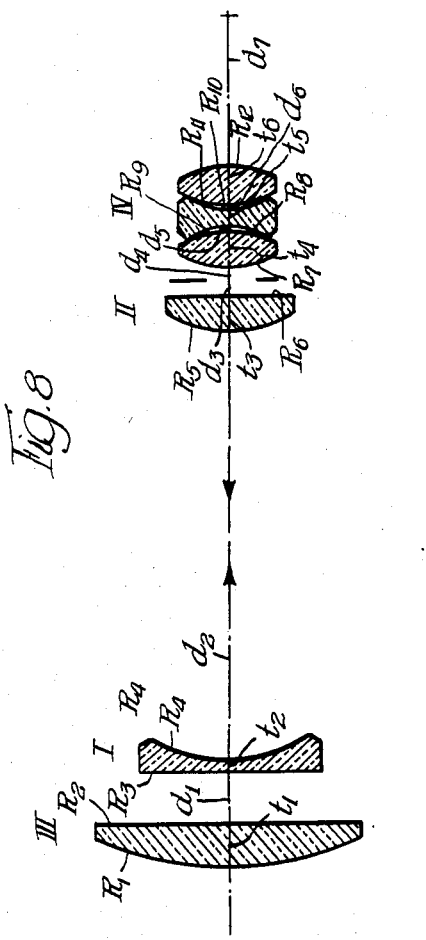
FIGURE 8 is a sectional view of still another modified form of the lens system embodying the invention.

The variable focal length system shown in FIGURE 8 is as follows:

Table IV

[8 mm. zoom camera lens. 9.45 to 25.27 mm. E.F.L. at f/2.2. Infinite object L=1]

| Lens Unit | Radii | Thicknesses (t), Spaces (d) | $N_D$ | V |
|---|---|---|---|---|
| III | $R_1=31.900$ | $t_1=2.500$ | 1.611 | 58.8 |
|  | $R_2=140.318$ | $d_1=4.677$ to $18.868$ |  |  |
| I | $R_3=$infinite | $t_2=1.000$ | 1.605 | 43.6 |
|  | $R_4=15.212$ | $d_2=31.334$ to $2.952$ |  |  |
| II | $R_5=19.559$ | $t_3=2.000$ | 1.611 | 58.8 |
|  | $R_6=$infinite | $d_3=1.644$ to $15.835$ |  |  |
|  | Stop | $d_4=1.016$ |  |  |
| IV | $R_7=7.913$ | $t_4=2.000$ | 1.611 | 58.8 |
|  | $R_8=-31.592$ | $d_5=.230$ |  |  |
|  | $R_9=-11.219$ | $t_5=2.000$ | 1.649 | 33.8 |
|  | $R_{10}=7.985$ | $d_6=.381$ |  |  |
|  | $R_{11}=31.592$ | $t_6=2.000$ | 1.611 | 58.8 |
|  | $R_{12}=-7.913$ | $d_7=10.167$ |  |  |

It is to be noted that the relay portion of the lens systems (lens unit IV) shown in FIGURES 5 through 8 are merely for exemplary purposes in that other lens constructions may be used to accomplish the same results. For that reason the lens unit IV in each of the systems is not to be considered as a limitation. Furthermore, in some instances the residual aberrations of the zoom portion may be sufficiently small in magnitude to eliminate the necessity of a relay lens.

In the schematic illustrations shown in FIGURES 1 through 3, the lens unit III is shown as being positioned between the object and lens unit I. In a modification of the system the relationship of lens unit III with respect to lens units I and II may be reversed. Specifically, lens unit III may be positioned adjacent lens unit II between it and an object to the right of the system. In that case lens units I and II will be calculated according to the equations and inequalities 1 through 4. Lens unit III will then be calculated according to the following inequality:

$f_3$ is chosen so that:

$$(5') \quad \frac{f_2^2 x}{ax-f_1^2} + \frac{f_3}{1-\frac{f_3}{S}} + f_2 - W_2' \geq \frac{\sqrt{Z}}{\sqrt{Z}+1}$$

Where:

$W_2'$ is a factor to take into account the thicknesses of lens units II and III, and $h_1$, to prevent interference therebetween.

It is to be understood that if lens unit III is adjacent lens unit II that the incident light will be from the right and that the object will be to the right of lens unit III. When the lens units are orientated in such fashion the lens unit III will form a fixed image at a point corresponding to point J in FIGURES 1 and 2. The lens units will then form an image at a point which corresponds to point P in FIGURES 1 and 2. The last named image point will vary in accordance with $\phi'$ which may be calculated by the following formula:

$$(14) \quad \phi' = \frac{L(L+1)e^3 - pBe^2 - QBe}{(L+1)e^2 - \left[\frac{(L+1)f_2^2 x}{ax-f_1^2} - a\right]e - \frac{f_1^2 f_2^2}{ax-f_1^2}}$$

It should also be kept in mind that other arrangements of the lens units may be used in the construction of the invention. For example, the first and third units may be used as the movable units with the second unit being stationary and intermediate the movable units. Further, the system may be such that it includes movable lens units of a number greater than two.

Although certain specific embodiments of the invention are disclosed herein it is to be understood that these are merely by way of example and in no manner to be considered as limitations. It will be apparent that certain modifications may be made within the scope of the claims without departing from the spirit of the invention.

I claim:

1. A variable focal length lens system comprising at least first and second optically aligned lens units, means for moving said first and second lens units relative to each other at some predetermined linear rate in which:

$$f_1^2 = \frac{(L+1)(x)(Ax+L)}{AL}$$

$$a = \frac{(L+1)(x)(Ax+2L)}{L(Ax+L)}$$

$$f_2^2 = \frac{-L(L+1)(x)(1-B)}{A(Ax+L)^2}$$

Where:

$$A = \frac{Z-1}{\sqrt{Z}} \quad m_1 = \frac{\sqrt{Z}}{\sqrt{Z}+1}$$

$$B = \frac{-(Ax+L)}{x} \quad \frac{\sqrt{Z}-1}{\sqrt{Z}+1} \quad m_2 = \frac{-1}{\sqrt{Z}+1}$$

$$f_1 < 0 \quad f_2 > 0 \quad m_1 - m_2 = 1$$

$$L > 0 \quad Z > 0 \quad \sqrt{Z} > 0$$

$x$ is chosen so that:

$$a + f_1 + f_2 - W_1 \geq \frac{L+1}{\sqrt{Z}+1}$$

Where:

Z is the zoom ratio;
$f_1$ and $f_2$ are the effective focal lengths of said first and second lens units, respectively;
L is the linear rate of motion of said first lens unit relative to said second lens unit;
e is the displacement of said second lens unit from a reference point;
$m_1$ and $m_2$ are the values of e when $\phi$ equals zero;
x is the distance from the image or object point to the primary focal point of said first lens unit when e is zero;
$W_1$ is a factor to take into account the thicknesses of said first and second lens units to prevent interference therebetween; and
$\phi$ is the deviation in focus when said first and second lens units are moved; and
a is the distance between the secondary focal point of said first lens units and the primary focal point of said second lens unit.

2. A variable focal length lens system as defined in claim 1 which further includes a third lens unit which is adjacent the object and in which said first and second lens units follow in that order in which:

$f_3$ is chosen so that:

$$x + \frac{f_3}{1-\frac{f_3}{S}} + f_1 - W_2 \geq \frac{L\sqrt{Z}}{\sqrt{Z}+1}$$

$f_3$ is the focal length of said third lens unit
S is the distance of the object
$W_2$ is a factor to take into account the thicknesses of said first and third lens unit.

3. A variable focal length lens system according to claim 2 in which the deviation of focus is within some predetermined range.

4. A variable focal length system according to claim 2 in which the general expression for the deviation of focus ($\phi$) is:

Where:

$$\phi = \frac{L(L+1)e^3 - pBe^2 - QBe}{L(L+1)e^2 - pe - Q}$$

$$B = \frac{d\phi}{dl}\bigg|_{e=0}$$

$$P = (L+1)x - La$$

$$Q = ax - f_1^2$$

5. A variable focal length lens system according to claim 4 which further includes a fourth lens unit which relays the image formed by said first, second and third lens units and substantially corrects the residual aberrations of the latter to within acceptable limtis.

6. A variable focal length lens system according to claim 4 in which the radii and glass of said first, second and third lens units are such that the residual aberrations are within a predetermined range throughout the zoom range.

7. A variable focal length lens system as defined in claim 1 which further includes a third lens unit which is adjacent the object and in which said third and said second lens units follow in that order in which:

$f_3$ is chosen so that:

$$\frac{f_2^2 x}{ax - f_1^2} + \frac{f_3}{1 - \frac{f_3}{S}} + f_2 - W_2' \geq \frac{\sqrt{Z}}{\sqrt{Z}+1}$$

Where:

$W_2'$ is a factor to take into account the thicknesses of said second and third lens units.

8. A variable focal length lens system according to claim 7 in which the deviation of focus is within some predetermined range.

9. A variable focal length lens system comprising first, second and third lens units with said third lens unit being adjacent the object and said first and second lens units following in that order and being movable relative to each other at a linear rate of unity in which the construction data of the lens system are as follows:

| Lens Unit | Radii | Thicknesses (t), Spaces (d) | $N_D$ | V |
|---|---|---|---|---|
| III | $R_1$=35.650<br>$R_2$=92.945 | $t_1$=3.840 | 1.620 | 60.3 |
| | | $d_1$=5.620 to 24.890 | | |
| I | $R_3$=−39.960<br>$R_4$=45.794 | $t_2$=1.840 | 1.620 | 60.3 |
| | | $d_2$=40.530 to 1.990 | | |
| II | $R_5$=38.763<br>$R_6$=−14.489<br>$R_7$=−81.067 | $t_3$=5.070<br>$t_4$=1.840 | 1.617<br>1.617 | 54.9<br>36.6 | wherein R, t, d, are the radii, thicknesses and spaces, respectively, and $N_D$, and V are the index of refraction in sodium D light and the reciprocal dispersion ratio, respectively.

10. A variable focal length lens system comprising first, second and third lens units with said third lens unit being adjacent the object and said first and second lens units following in that order and being movable relative to each other at a linear rate of unity in which the construction data of the lens system are as follows:

| Lens Unit | Radii | Thicknesses (t), Spaces (d) | $N_D$ | V |
|---|---|---|---|---|
| III | $R_1$=44.710<br>$R_2$=197.840 | $t_1$=3.500 | 1.620 | 60.3 |
| | | $d_1$=6.513 to 26.380 | | |
| I | $R_3$=infinite<br>$R_4$=21.825 | $t_2$=1.500 | 1.620 | 60.3 |
| | | $d_2$=43.867 to 4.133 | | |
| II | $R_5$=27.652<br>$R_6$=−17.924<br>$R_7$=infinite | $t_3$=2.400<br>$t_4$=1.00 | 1.617<br>1.617 | 54.9<br>54.9 | wherein R, t, d, are the radii, thicknesses and spaces, respectively, and $N_D$, and V are the index of refraction in sodium D light and the reciprocal dispersion ratio, respectively.

11. A variable focal length lens system comprising first, second and third lens units with said third lens unit being adjacent the object and said first and second lens units following in that order and being movable relative to each other at a linear rate of unity in which the construction data of the lens system are as follows:

| Lens Unit | Radii | Thicknesses (t), Spaces (d) | $N_D$ | V |
|---|---|---|---|---|
| III | $R_1$=68.439<br>$R_2$=−1,246.490 | $t_1$=3.664 | 1.620 | 60.3 |
| | | $d_1$=4.355 to 35.580 | | |
| I | $R_3$=infinite<br>$R_4$=23.294 | $t_2$=2.695 | 1.620 | 60.3 |
| | | $d_2$=66.356 to 3.906 | | |
| II | $R_5$=27.915<br>$R_6$=−27.375<br>$R_7$=infiinite | $t_3$=3.288<br>$t_4$=1.617 | 1.617<br>1.689 | 54.9<br>30.9 | wherein R, t, d, are the radii, thicknesses and spaces, respectively, and $N_D$, and V are the index of refraction in sodium D light and the reciprocal dispersion ratio, respectively.

12. A variable focal length lens system comprising first, second and third lens units with said third lens unit being adjacent the object and said first and second lens units following in that order and being movable relative to each other at a linear rate of unity in which the construction data of the lens system are as follows:

| Lens Unit | Radii | Thicknesses (t), Spaces (d) | $N_D$ | V |
|---|---|---|---|---|
| III | $R_1$=31.900<br>$R_2$=140.318 | $t_1$=2.500 | 1.611 | 58.8 |
| | | $d_1$=4.677 to 18.868 | | |
| I | $R_3$=infinite<br>$R_4$=15.212 | $t_2$=1.000 | 1.605 | 43.6 |
| | | $d_2$=31.334 to 2.952 | | |
| II | $R_5$=19.559<br>$R_6$=infinite | $t_3$=2.000 | 1.611 | 58.8 | wherein R, t, d, are the radii, thicknesses and spaces, respectively, and $N_D$, and V are the index of refraction in sodium D light and the reciprocal dispersion ratio, respectively.

13. A variable focal length lens system comprising first, second, third and fourth lens units in which the third lens unit is adjacent the object and said first, second, and fourth lens units follow in that order, in which the constructional data of the lens system are as follows:

| Lens Unit | Radii | Thicknesses ($t$), Spaces ($d$) | $N_D$ | V |
|---|---|---|---|---|
| III | $R_1=35.650$ | $t_1=3.840$ | 1.620 | 60.3 |
|  | $R_2=92.945$ | $d_1=5.620$ to $24.890$ |  |  |
| I | $R_3=-39.960$ | $t_2=1.840$ | 1.620 | 60.3 |
|  | $R_4=45.794$ | $d_2=40.530$ to $1.990$ |  |  |
| II | $R_5=38.768$ | $t_3=5.070$ | 1.617 | 54.9 |
|  | $R_6=-14.489$ | $t_4=1.840$ | 1.617 | 36.6 |
|  | $R_7=-81.067$ | $d_3=4.270$ to $23.540$ |  |  |
|  | Stop | $d_4=1.460$ |  |  |
| IV | $R_8=11.420$ | $t_5=3.840$ | 1.617 | 54.9 |
|  | $R_9=-11.420$ | $t_6=2.780$ | 1.720 | 29.3 |
|  | $R_{10}=\text{Infinity}$ | $d_5=12.000$ |  |  | wherein R, $t$, $d$, are the radii, thicknesses and spaces, respectively, and $N_D$, and V are the index of refraction in sodium D light and the reciprocal dispersion ratio, respectively.

14. A variable focal length lens system comprising first, second, third and fourth lens units in which the third lens unit is adjacent the object and said first, second, and fourth lens units follow in that order, in which the constructional data of the lens system are as follows:

| Lens Unit | Radii | Thicknesses ($t$), Spaces ($d$) | $N_D$ | V |
|---|---|---|---|---|
| III | $R_1=44.71$ | $t_1=3.500$ | 1.620 | 60.3 |
|  | $R_2=197.840$ | $d_1=6.513$ to $26.380$ |  |  |
| I | $R_3=\text{infinite}$ | $t_2=1.500$ | 1.620 | 60.3 |
|  | $R_4=21.825$ | $d_2=43.867$ to $4.133$ |  |  |
| II | $R_5=27.652$ | $t_3=2.400$ | 1.617 | 54.9 |
|  | $R_6=-17.924$ | $t_4=1.00$ | 1.617 | 36.6 |
|  | $R_7=\text{infinite}$ | $d_3=2.414$ to $22.281$ |  |  |
|  | Stop | $d_4=1.00$ |  |  |
| IV | $R_8=12.700$ | $t_5=2.200$ | 1.620 | 60.3 |
|  | $R_9=-51.600$ | $d_5=.444$ |  |  |
|  | $R_{10}=-12.700$ | $t_6=2.000$ | 1.649 | 33.8 |
|  | $R_{11}=14.820$ | $d_6=.498$ |  |  |
|  | $R_{12}=\text{infinite}$ | $t_7=2.000$ | 1.617 | 54.9 |
|  | $R_{13}=-16.00$ | $d_7=.127$ |  |  |
|  | $R_{14}=28.700$ | $t_8=2.380$ | 1.620 | 60.3 |
|  | $R_{15}=-16.00$ | $d_8=10.7498$ |  |  | wherein R, $t$, $d$, are the radii, thicknesses and spaces, respectively, and $N_D$, and V are the index of refraction in sodium D light and the reciprocal dispersion ratio, respectively.

15. A variable focal length lens system comprising first, second, third and fourth lens units in which the third lens unit is adjacent the object and said first, second, and fourth lens units follow in that order, in which the constructional data of the lens system are as follows:

| Lens Unit | Radii | Thicknesses ($t$), Spaces ($d$) | $N_D$ | V |
|---|---|---|---|---|
| III | $R_1=68.439$ | $t_1=3.664$ | 1.620 | 60.3 |
|  | $R_2=-1,246.490$ | $d_1=4.355$ to $35.580$ |  |  |
| I | $R_3=\text{infinite}$ | $t_2=2.695$ | 1.620 | 60.3 |
|  | $R_4=23.294$ | $d_2=66.356$ to $3.906$ |  |  |
| II | $R_5=27.915$ | $t_3=3.288$ | 1.617 | 54.9 |
|  | $R_6=27.375$ | $t_4=1.617$ | 1.689 | 30.9 |
|  | $R_7=\text{infinite}$ | $d_3=1.790$ to $33.015$ |  |  |
|  | Stop | $d_4=.964$ |  |  |
| IV | $R_8=12.051$ | $t_5=2.087$ | 1.617 | 54.9 |
|  | $R_9=-48.962$ | $d_5=.422$ |  |  |
|  | $R_{10}=-12.051$ | $t_6=1.897$ | 1.649 | 33.8 |
|  | $R_{11}=14.062$ | $d_6=.472$ |  |  |
|  | $R_{12}=\text{infinite}$ | $t_7=1.897$ | 1.617 | 54.9 |
|  | $R_{13}=-15.182$ | $d_7=.120$ |  |  |
|  | $R_{14}=27.233$ | $t_8=2.258$ | 1.620 | 60.3 |
|  | $R_{15}=-15.182$ | $d_8=10.543$ |  |  | wherein R, $t$, $d$, are the radii, thicknesses and spaces, respectively, and $N_D$, and V are the index of refraction in sodium D light and the reciprocal dispersion ratio, respectively.

16. A variable focal length lens system comprising first, second, third and fourth lens units in which the third lens unit is adjacent the object and said first, second, and fourth lens units follow in that order, in which the constructional data of the lens system are as follows:

| Lens Unit | Radii | Thicknesses ($t$), Spaces ($d$) | $N_D$ | V |
|---|---|---|---|---|
| III | $R_1=31.900$ | $t_1=2.500$ | 1.611 | 58.8 |
|  | $R_2=140.318$ | $d_1=4.677$ to $18.868$ |  |  |
| I | $R_3=\text{infinite}$ | $t_2=1.000$ | 1.605 | 43.6 |
|  | $R_4=15.212$ | $d_2=31.334$ to $2.952$ |  |  |
| II | $R_5=19.559$ | $t_3=2.000$ | 1.611 | 58.8 |
|  | $R_6=\text{infinite}$ | $d_3=1.644$ to $15.835$ |  |  |
|  | Stop | $d_4=1.016$ |  |  |
| IV | $R_7=7.913$ | $t_4=2.00$ | 1.611 | 58.8 |
|  | $R_8=-31.592$ | $d_5=.230$ |  |  |
|  | $R_9=-11.219$ | $t_5=2.000$ | 1.649 | 33.8 |
|  | $R_{10}=7.985$ | $d_6=.381$ |  |  |
|  | $R_{11}=31.592$ | $t_6=2.000$ | 1.611 | 58.8 |
|  | $R_{12}=-7.913$ | $d_7=10.167$ |  |  | wherein R, $t$, $d$, are the radii, thicknesses and spaces, respectively, and $N_D$, and V are the index of refraction in sodium D light and the reciprocal dispersion ratio, respectively.

References Cited by the Examiner
UNITED STATES PATENTS

| 1,927,925 | 9/1933 | Dieterich | 88—57 |
| 2,235,364 | 3/1941 | Gramatzki | 88—57 |
| 2,766,658 | 10/1956 | Schwesinger | 88—57 |
| 2,847,907 | 8/1958 | Angenieux | 88—57 |
| 2,937,572 | 5/1960 | Yamaji | 88—57 |

DAVID H. RUBIN, *Primary Examiner.*

EMIL G. ANDERSON, JEWELL H. PEDERSEN,
*Examiners.*